(12) United States Patent
Sahu et al.

(10) Patent No.: US 12,602,713 B2
(45) Date of Patent: Apr. 14, 2026

(54) DEDUCTION CLAIM DOCUMENT PARSING ENGINE

(71) Applicant: HighRadius Corporation, Houston, TX (US)

(72) Inventors: Debashish Sahu, Hyderabad (IN); Souranil De, Hyderabad (IN); Ritwik Upadhyay, Hyderabad (IN); Srinivas Rapaka, Hyderabad (IN); Susanta Kumar Sahoo, Hyderabad (IN); Lohit Vankina, Hyderabad (IN)

(73) Assignee: HighRadius Corporation, Houston, TX (US)

( * ) Notice: Subject to any disclaimer, the term of this patent is extended or adjusted under 35 U.S.C. 154(b) by 327 days.

(21) Appl. No.: 18/480,783

(22) Filed: Oct. 4, 2023

(65) Prior Publication Data

US 2025/0117833 A1 Apr. 10, 2025

(51) Int. Cl.
| | |
|---|---|
| *G06F 3/048* | (2013.01) |
| *G06F 40/174* | (2020.01) |
| *G06Q 30/04* | (2012.01) |
| *G06V 30/412* | (2022.01) |
| *G06V 30/413* | (2022.01) |

(52) U.S. Cl.
CPC ........... *G06Q 30/04* (2013.01); *G06F 40/174* (2020.01); *G06V 30/412* (2022.01); *G06V 30/413* (2022.01)

(58) Field of Classification Search
CPC .... G06Q 30/04; G06F 40/174; G06V 30/413; G06V 30/412
See application file for complete search history.

(56) References Cited

U.S. PATENT DOCUMENTS

| | | | | |
|---|---|---|---|---|
| 10,810,420 B2 * | 10/2020 | Bhatnagar | ............... | G06F 18/22 |
| 12,087,068 B2 * | 9/2024 | Rossi | ............... | G06V 30/19173 |
| 2008/0252924 A1 * | 10/2008 | Gangai | ............. | G06V 30/1448 358/1.15 |
| 2015/0106257 A1 * | 4/2015 | Maczuszenko | ........ | G06Q 40/03 705/38 |

(Continued)

FOREIGN PATENT DOCUMENTS

| | | |
|---|---|---|
| CN | 113420116 B | 12/2022 |

OTHER PUBLICATIONS

Extended European Search Report for Application No. 24204453.5 dated Dec. 16, 2024, 12 pages.

(Continued)

*Primary Examiner* — David Phantana-angkool
(74) *Attorney, Agent, or Firm* — Quarles & Brady LLP

(57) ABSTRACT

The present invention is related to data processing methods and systems thereof. According to an embodiment, the present invention provides a method of processing claim deduction documents using a machine learning model. The process begins by accessing data files and extracting information from them, which is subsequently stored. This document information, along with the machine learning model trained on various document formats, is used to classify the data files and generate tabular data. From this tabular data, data objects are created and included in an output data file. The information from the output file is then used to update the data of the machine learning model, optimizing it for improved future document processing. There are other embodiments as well.

19 Claims, 6 Drawing Sheets

(56) References Cited

U.S. PATENT DOCUMENTS

| | | | | |
|---|---|---|---|---|
| 2020/0074169 A1* | 3/2020 | Mukhopadhyay | ...... | G06F 18/22 |
| 2020/0125592 A1 | 4/2020 | Teruya et al. | | |
| 2022/0309549 A1* | 9/2022 | Xu | ........................ | G06V 30/412 |
| 2022/0392047 A1* | 12/2022 | Wheaton | ................ | G06V 10/40 |
| 2022/0414328 A1* | 12/2022 | Nguyen | ............... | G06V 30/414 |
| 2023/0065915 A1* | 3/2023 | Berestovsky | ........... | G06F 18/22 |
| 2023/0095673 A1 | 3/2023 | Dharmasiri et al. | | |
| 2023/0113578 A1 | 4/2023 | Kumar et al. | | |
| 2023/0267273 A1 | 8/2023 | Theriappan et al. | | |
| 2024/0419742 A1* | 12/2024 | Marcum | ................ | G06V 30/42 |
| 2025/0181650 A1* | 6/2025 | Wang | .................... | G06F 16/906 |
| 2025/0191308 A1* | 6/2025 | Kusber | ................ | G06T 19/006 |
| 2025/0348478 A1* | 11/2025 | Papir | .................... | G06F 16/242 |
| 2025/0370908 A1* | 12/2025 | McCourt | ............. | G06F 11/3612 |

OTHER PUBLICATIONS

Liu Hao et al: "Show, Read and Reason 1-15, Table Structure Recognition with Flexible Context Aggregator", Proceedings of the 45th International ACM SIGIR Conference on Research and Development in Information Retrieval, ACMPUB27, New York, NY, USA, Oct. 17, 2021 (Oct. 17, 2021), pp. 1084-1092.

* cited by examiner

100

200

Figure 3:
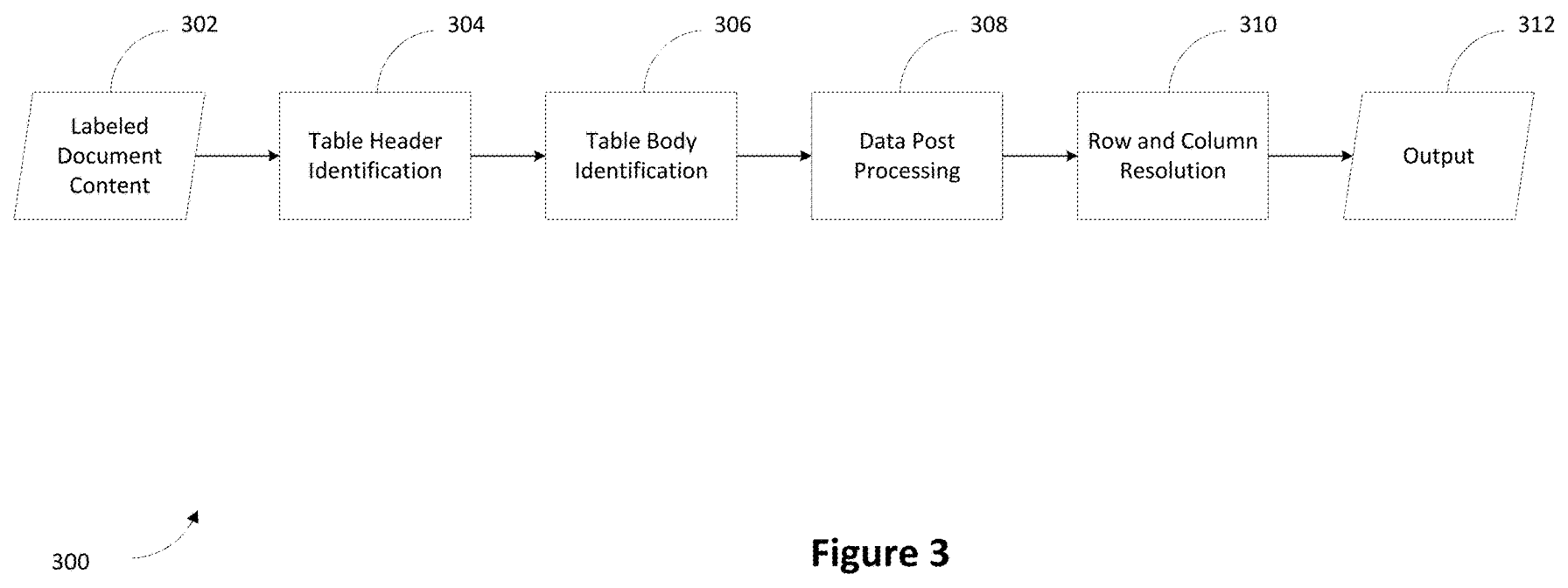

302 Labeled Document Content

304 Table Header Identification

306 Table Body Identification

308 Data Post Processing

310 Row and Column Resolution

312 Output

502 Labeled Document Content

504 Non-Tabular Key Identification

506 Non-Tabular Value Identification

508 Data Post Processing

510 Row and Column Resolution

512 Output

500

| Invoice Number | Item | Description of Damage | Total Amount of Item | Deduction Claimed |
|---|---|---|---|---|
| 12345 | Widget 1 | Dented | 100 | 10 |
| 23456 | Widget 2 | Broken | 200 | 200 |
| 34567 | Widget 3 | Dented | 300 | 150 |

DEDUCTION CLAIM DOCUMENT PARSING ENGINE

CROSS-REFERENCES TO RELATED APPLICATIONS

The present application is related to U.S. application Ser. No. 18/480,741, entitled "Methods and Systems for Machine-Learning Based Document Processing", filed Oct. 4, 2023, which is commonly owned and incorporated by reference herein for all purposes.

FIELD OF INVENTION

The present disclosure relates to a document parsing engine. More specifically, the present disclosure relates to a deduction claim document parsing engine.

BACKGROUND OF THE INVENTION

A deduction claim can occur when there is a dispute or disagreement over the quality or quantity of goods or services provided or when there is an error or discrepancy in the invoice or billing statement. When the deduction claim occurs, a customer requests that the seller reduce the amount owed to a supplier/seller for goods or services provided by issuing a deduction claim document.

A deduction claim document typically includes information such as the amount being disputed, the reason for the deduction, invoice number and any supporting documentation or evidence, such as photographs, receipts, or contracts. The supplier/seller can then review the claim and either approve the deduction or dispute it, which may lead to further negotiations or legal action.

There is no industry-standard format for deduction claim documents. Deduction claim documents come in a wide variety of formats (e.g., tabular data, non-tabular data, paragraphs, etc.) and file types (e.g., pdf, doc, spreadsheet, image etc.). Typically, a seller or business receives a large number of deduction claim documents of a variety of formats and/or types.

Traditionally, the bulk of these documents are manually processed by large finance teams. This team's responsibilities involve feeding the document details into accounting systems, a process that is not only tedious but also prone to errors and expensive. Manual processing of such extensive datasets leads to inefficient usage of computing and storage resources.

Current solutions, such as general-purpose document parsing software and Optical Character Recognition (OCR) systems, have been employed to parse financial documents. Nevertheless, these come with their own set of disadvantages, primarily low accuracy and processing speed. Additionally, typically each of these document parsing systems or OCR systems are customized for a particular customer or customer form and cannot be used to process documents from other customers. Each time a new customer or new deduction form is received by a seller or business, the document parsing systems or OCR systems need to be adapted to the new customer which is time consuming and inefficient.

It is to be appreciated that embodiments of the present invention provides machine learning-based methods and systems for automating the parsing and extraction of data from various documents, such as deduction claim documents.

BRIEF SUMMARY OF THE INVENTION

The present invention is related to data processing methods and systems thereof.

According to an embodiment, the present invention provides a method of processing documents using a machine learning model. The process begins by accessing data files and extracting information from them, which is subsequently stored. This document information, along with the machine learning model trained on various document formats, is used to classify the data files and generate tabular data. From this tabular data, data objects are created and included in an output data file. The information from the output file is then used to update the data of the machine learning model, optimizing it for improved future document processing. There are other embodiments as well.

In a first aspect, a method for processing documents includes receiving a first document containing a deduction claim; extracting document information from the first document; classifying the document information using a first machine learning model, the first machine learning model being trained using a plurality of document formats; generating one or more data objects associated with the deduction claim based on the classification of the document information using the first machine learning model; providing an output data file comprising the one or more data objects; and updating the first machine learning model using at least the output data file.

In some embodiments, the document information comprises at least one of customer information, entity information, invoice information, deduction claim information, supporting information, contact information, signature information, or date information.

In various instances, classifying the document information using the first machine learning model comprises identifying within the document information at least one of tabular data or non-tabular data and classifying using the first machine learning model the document information based on an identification of at least one of tabular data or non-tabular data. The non-tabular data comprises at least one of key-value pairs or paragraph data.

In some cases, the document information comprises both tabular data and non-tabular data. Classifying the document information using the first machine learning model comprises identifying document information associated with the tabular data and the non-tabular data; extracting using a first extraction module the tabular data; and extracting using a second extraction module the non-tabular data.

In various embodiments, the method further includes generating a table using the one or more data objects, the table comprising one or more first data objects generated based on the extraction of the tabular data and one or more second data objects generated based on the extraction of the non-tabular data.

In some instances, the document information comprises at least one of tabular data or non-tabular data. In some cases, generating the one or more data objects associated with the deduction claim based on the tabular data comprises processing the tabular data with two or more tabular data extraction modules, wherein the two or more tabular data extraction modules process the tabular data in parallel and generating the one or more data objects associated with the deduction claim based on the tabular data processed by the two or more tabular data extraction modules. In some cases, generating the one or more data objects associated with the deduction claim based on the non-tabular data comprises processing the non-tabular data with two or more key-value pair data extraction modules, wherein the two or more key-value pair data extraction modules process the non-tabular data in parallel and generating the one or more data objects associated with the deduction claim based on the non-tabular data processed by the two or more key-value pair data extraction modules. When the two or more tabular data extraction modules generate repeating or redundant first data objects, the one or more repeating or redundant first data objects can be removed based on an order of preference associated with the two or more tabular data extraction modules. When the two or more key-value pair data extraction modules generate repeating or redundant second data objects, the one or more repeating or redundant second data objects can be removed based on an order of preference associated with the two or more key-value pair data extraction modules.

In various cases, classifying using the first machine learning model the document information further comprises classifying the document information into at least one of one or more keys or one or more values. In some embodiments, generating the one or more data objects further comprises defining at least one data object of the one or more data objects as at least one of a key or a value. In some cases, the method further comprises associating the at least one data object using a second machine learning model with one or more attributes of the data output file. Associating the one or more data objects with the one or more attributes of the data output file can further comprise associating the at least one data object with one or more attributes of the data output file based on whether the at least one data object is defined as at least one of the key or the value; based on a determination that the at least one data object is defined as the key, matching the key with a first header of the data output file using the second machine learning algorithm; and based on a determination that the at least one data object is defined as the value, determining a corresponding key using the second machine learning algorithm associated with the value from the document information or the one or more data objects, matching using the second machine learning algorithm the corresponding key with a corresponding header of the data output file, and adding using the second machine learning algorithm the value to the corresponding header of the data output file.

In some embodiments, the method further includes generating a table using the one or more data objects, the table comprising a header that is based at least on the document information. The header can be at least one of customer information, entity information, invoice information, deduction claim information, supporting information, contact information, signature information, or date information.

In another aspect, a method for processing documents can include extracting document information from one or more deduction claim documents by a data extraction module; classifying the one or more deduction claim documents or the document information using a machine learning model, the machine learning model being trained using a plurality of document formats; generating one or more data objects associated with at least one corresponding deduction claim based on the classification of the document information using the machine learning model; providing an output data file comprising the data objects; providing an accuracy assessment for the at least one corresponding deduction claim by comparing the output data file to reference data or ground truth data; and modifying the machine learning model using at least the accuracy assessment.

The method can further include identifying error patterns associated with the output data file, wherein the error patterns comprise at least one error pattern associated with at least one of customer information, entity information, invoice information, deduction claim information, supporting information, contact information, signature information, or date information for the at least one corresponding deduction claim. In some cases, the method includes modifying the machine learning model using at least the error patterns or modifying the data extraction module using at least the error patterns.

In some instances, comparing the output data file to reference data or ground truth data comprises comparing one or more data objects in the output data file to at least one customer information, entity information, invoice information, deduction claim information, supporting information, contact information, signature information, or date information stored in a data storage and associated with the at least one corresponding deduction claim.

In various embodiments, the method includes classifying the document information into tabular data, key-value pair data, value data, or paragraph data.

In yet another aspect, a method for processing documents can include accessing one or more deduction claims; extracting document information from the one or more deduction claims; classifying the document information using a first machine learning model to generate, the first machine learning model being trained using a plurality of document formats; generating one or more data objects associated with at least one corresponding deduction claim and based on the classification of the document information using the first machine learning model; associating the one or more data objects using a second machine learning model with one or more attributes of the data output file; and generating an output data file based on the second machine learning module comprising the one or more data objects associated with the one or more attributes of the data output file.

The method can further include prioritizing or ordering two or more corresponding deduction claims in the output data file based on at least one of customer information, entity information, invoice information, deduction claim information, supporting information, contact information, signature information, or date information associated with the at least one corresponding deduction claim.

It is to be appreciated that embodiments of the present invention provide many advantages over conventional techniques. Among other features, embodiments of the present invention allow for accessing and extracting information from various data files and store it in different types of data storage systems provides extensive flexibility and adaptability. It can handle diverse document formats, making it useful across a wide range of applications and industries, including financial, academic, healthcare, legal, and more. It is to be appreciated that embodiments of the present invention are not restricted by the type of memory storage in use, whether it be a hard disk, non-volatile memory, a database, or a server connected to a network. This scalability ensures compatibility with various infrastructures, improving its adaptability in different contexts.

Embodiments of the present invention use machine learning models for document classification to provide a significant advantage. These models, trained on a multitude of document formats, can accurately and efficiently generate tabular data from a vast array of documents. The machine learning model's ability to continually learn and update itself using output data files leads to continuous improvement in its performance, reducing the possibility of errors over time. This machine learning feature also facilitates automatic adaptation to new or changed document formats, reducing the need for manual intervention. Moreover, the system's ability to remove noise from document information enhances the accuracy of data extraction. This feature is particularly crucial when dealing with vast volumes of data, where manual error correction would be time-consuming and resource-intensive. Additionally, the generation of data objects and subsequent creation of a table with a header based on tabular data facilitates easy interpretation and utilization of extracted data. Various embodiments also enable removal of non-tabular data from the table, ensuring that the extracted data is concise and relevant. Furthermore, the ability to determine table structure based on the tabular data is an innovative feature that increases the versatility of the system, enabling it to handle complex document structures.

The capability to provide an accuracy assessment by comparing the output data file with reference or ground truth data is another crucial advantage. This feature allows for immediate error identification, enabling the machine learning model to be promptly modified for improved accuracy. The method's capacity to identify error patterns associated with the output data file and subsequently adjust the machine learning model or the data extraction module leads to improved system performance over time. Various embodiments' ability to produce an evaluation report, which highlights error patterns and distributions associated with the output data file, offers a valuable tool for system improvement. This function enables the identification of recurring errors, allowing targeted modifications to enhance system performance. Furthermore, certain embodiments' capacity to format the output data file to fit a database structure, and its ability to classify data files into various categories, provides users with more structured and usable outputs.

The present invention achieves these benefits and others in the context of known technology. However, a further understanding of the nature and advantages of the present invention may be realized by reference to the latter portions of the specification and attached drawings.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 3 is a flow diagram illustrating a process for extracting tabular data of one or more deduction claim documents using at least one of a default table characteristic repository module, a domain dictionary module, a table identification learning module, or a custom table rule identification module according to embodiments of the present invention.

6 documents using at least one of a default key-value pair characteristic repository module, a key-value pair domain dictionary module, a key-value pair identification learning module, or a custom key-value pair rule identification module according to embodiments of the present invention.

Figure 6:
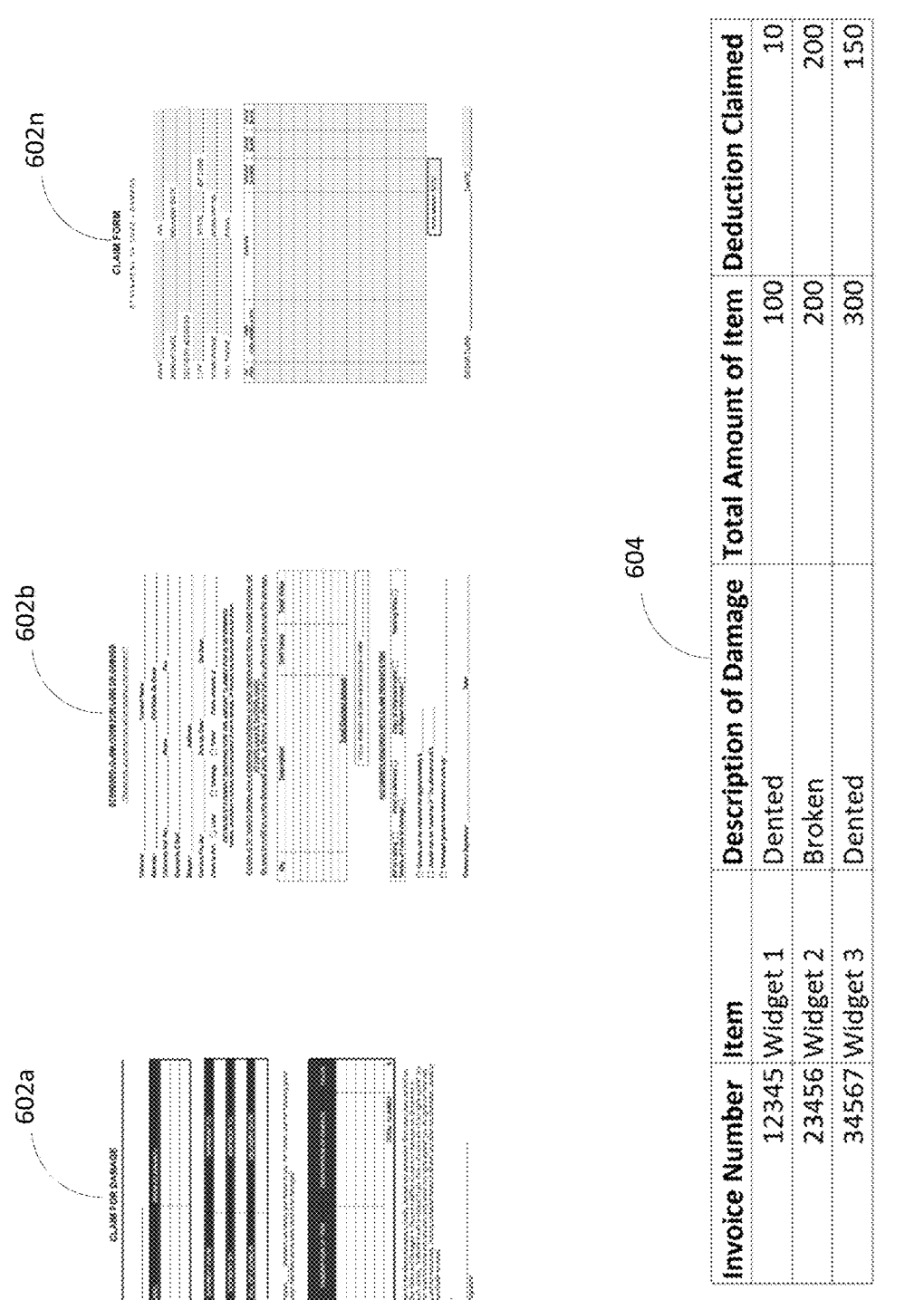

FIG. 6 is a simplified diagram showing an exemplary data output file generated based on a plurality of processed documents according to embodiments of the present invention.

DETAILED DESCRIPTION OF THE INVENTION

The present invention is related to data processing methods and systems thereof.

According to an embodiment, the present invention provides a method of processing documents (e.g., claim deduction documents or the like) using a machine learning model. The process begins by accessing data files (e.g., claim deduction documents) and extracting information from them, which is subsequently stored. The document information within the data files is the classified using a machine learning model and tabular data can be generated. From this tabular data, data objects are created and included in an output data file. The information from the output file is then used to update the data of the machine learning model, optimizing it for improved future document processing. There are other embodiments as well.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counterclockwise have been used for convenience purposes only and are not intended to imply any particular fixed direction. Instead, they are used to reflect relative locations and/or directions between various portions of an object.

Figure 1:
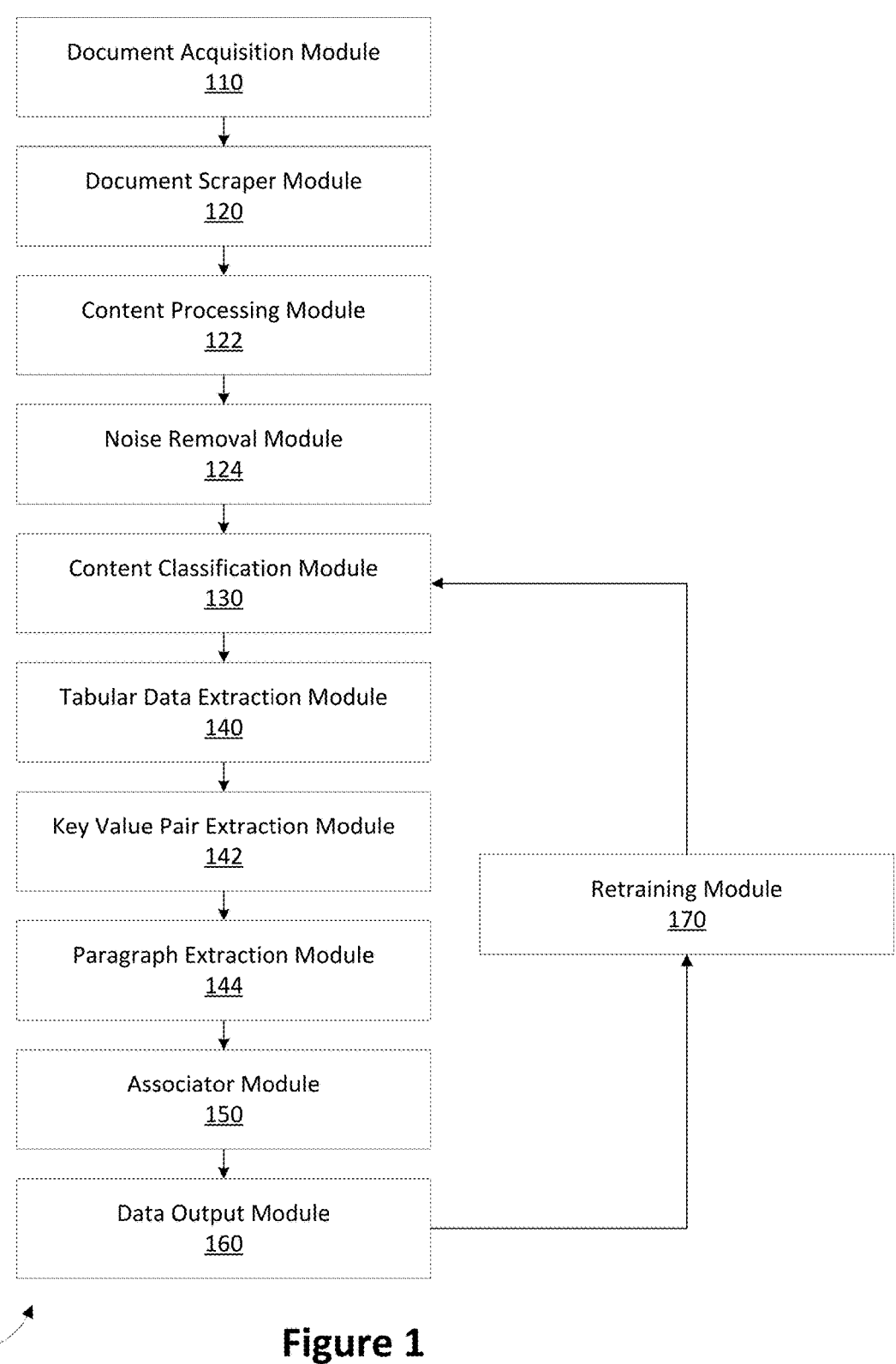
FIG. 1 is a simplified diagram illustrating a data processing system according to embodiments of the present invention.

FIG. 1 is a simplified diagram illustrating a data processing system 100 according to embodiments of the present invention. This diagram is merely an example, which should not unduly limit the scope of the claims. One of ordinary skill in the art would recognize many variations, alternatives, and modifications. As an example, system 100 includes components of the machine learning based system for parsing and extracting tabular and non-tabular data are as follows:

| Stage | Component/ Module | Remarks |
|---|---|---|
| Data Input | Document Acquisition Module (110) | The document acquisition module is configured to handle the input of the data files (e.g., claim deduction documents or the like) from one or more sources including but not limited to financial databases, email, application programming interfaces (APIs), or the like. |
| Pre-proc-essing stage | Document Scraper module (120) | The Document Scraper Module is configured for parsing and scraping data from the document. The Document Scraper Module can scrape words, phrases, numbers and special characters along with relevant metadata. |
| | Content Processing Module (122) | The Content Processing Module is configured to group or de-group words and phrases found in financial documents. |
| | Noise Removal Module (124) | The Noise Removal Module is configured to remove unwanted or irrelevant data from text data. |
| ML stage | Content Classification ML Module (130) | A fine-tuned LayoutLM vl model has been trained to extract information from financial documents, and classify them into tabular data and non-tabular (key-value pair data). |
| Post-proc-essing | Tabular Data Extraction Rule Module (140) | The Tabular Data Extraction Rule Engine is configured to identify, extract and transform any tabular content present in this labeled content of the document into their columns, rows and corresponding headers or values. |
| | Key Value Pair Data Extraction Rule Module (142) | The Key Value Pair Data Extraction Rule Module is configured to identify and extract keys present in the labeled content and map them to their corresponding values in the document. |
| | Paragraph Extraction Module (144) | The Paragraph Extraction Module is configured to identify and extract data not identified as tabular data or key-value pair data. |
| | Associator Module (150) | The Associator Module 150 associates tabular keys, non-tabular keys, and paragraphs from the claim deduction document to appropriate attributes, headers, or keys of a claim output in data output module 160. |
| Output | Data Output Module (160) | Represents the extracted data to the users and updates other databases with the extracted information. |
| Accuracy Assess-ment & Re-training | Accuracy Assessment & Feedback Module (170) | Evaluates the accuracy of data extraction from financial documents and provides feedback/retraining capabilities for continuous improvement. |

As an example, terms "module" and "stage" is understood to encompass a functional component of a system, which may be implemented in software, hardware, or a combination of both. A module implemented in software may include but is not limited to a subroutine, a function, a procedure, an object, a class, an instance, a sequence of instructions or a part of a software program. The software may be stored on a non-transitory computer-readable medium and may be executed by one or more processors of a computing device. On the other hand, a module implemented in hardware may include but is not limited to a circuit, an integrated circuit, a microcontroller, a microprocessor, a system-on-chip (SoC), a field-programmable gate array (FPGA), or other custom or commercially available hardware components or devices, or a combination thereof. A module may also be implemented as a combination of software and hardware components, where the software controls, instructs, or otherwise interfaces with the hardware to perform the intended functionalities of the module. It will be appreciated that the decision as to whether to implement a module in hardware or software, or a combination thereof, would be driven by the cost and performance considerations that are well-known in the art.

It is understood that a "module" or a "stage" as used herein refers to an abstract functional component and may be distributed among different hardware and software components in various locations and systems, and is not limited to a single functional component located in a single location.

According to various embodiments, document acquisition module 110 is configured to manage and facilitate the import of data files (e.g., claim deduction documents 602a-602n of FIG. 6, or the like). Deduction claim documents are a written record or form submitted by a customer or entity to a company or business, outlining the details of a deduction request in relation to an outstanding account receivable. A deduction claim refers to a customer's assertion or request for a reduction or adjustment in the amount owed to a seller business. A deduction claim typically arises when the customer believes there is a valid reason to reduce the outstanding balance, due to issues such as product defects, damaged goods, pricing discrepancies, or other issues that may impact the agreed-upon payment. A deduction claim document typically includes information associated with the deduction claim such as the customer's name, account number, reason for the claim, supporting documentation (such as invoices, receipts, or product photos), requested deduction amount, and any additional relevant details. The deduction claim document serves as a formal communication from the customer to the company, initiating the process of reviewing and resolving the deduction claim.

The document acquisition module 110 may have the capability to support an extensive range of claim deduction documents in a variety of document formats (e.g., tabular data, non-tabular data, or the like) and in a variety of document types including, but not limited to, PDF, spreadsheets, text documents, images, JPG, PNG, GIG, TIFF, email, HTML, XML, CSV files, and others commonly employed in financial systems. Module 110 can also process documents written in various Latin script languages such as English, French, Spanish, and more. In various implementations, document acquisition module 110 offers an interactive interface that enables manual document uploads by users. This user interface includes validation and error-checking mechanisms to ensure the uploaded files adhere to supported formats. The system provides users with immediate feedback if the uploaded document's format is incompatible.

In some embodiments, document acquisition module 110 can autonomously retrieve documents from an integrated database, like a financial data repository. Regardless of the format or language in which these documents are stored, the module can automatically identify and extract pertinent ones.

For example, the document acquisition module 110 can identify and extract documents associated with claim deductions. In order to search, find, and/or extract documents associated with claim deductions the document acquisition module 110 can look for documents with specific features. In a non-limiting example, the document acquisition module 110 can search for documents and extract documents comprising at least one of customer information, entity information, invoice information, deduction claim information, supporting information, contact information, signature information, or date information, or the like.

The customer information or entity information can include, without limitation, at least one of a name, an address, contact details (e.g., phone number, email address, or the like) of the customer or entity making the claim, or the like. The invoice information can include, without limitation, at least one of an invoice number, a date, an amount related to the disputed transaction, or the like. The deduction claim information can include, without limitation, at least one of a reason for the claim, a description of an issue or error, dispute information, an amount being withheld, a claim document number, a claim number, a reference number, or the like. Supporting information can include any relevant documents, such as receipts, bills, statements, delivery records, or correspondence, which support the customer's claim, or the like. Contact information can include, without limitation, a name, phone number, email, address, or the like associated with a person or entity that can help resolve a deduction claim. Signature information can include a customer's signature. Date information can include a date a claim was submitted, a date goods were delivered, a date when an issue was found, or the like.

In some cases, in order to search for and identify one or more claim deduction documents, the document acquisition module 110 can look for specific key words associated with deduction claims. In a non-limiting example, these terms might include, without limitation, damage, defect, discrepancy, reduction, deduction, amount withheld, claim, dispute, or the like.

In some implementations, document acquisition module 110 may be configured to pull documents from external databases via Application Programming Interfaces (APIs). It is designed to handle a wide variety of APIs used for accessing financial documents in diverse formats and languages. User authentication and secure document access are safeguarded during this process, and the document acquisition module 110 offers feedback if an incompatible document format is detected.

Depending on the implementation, document acquisition module 110 may be configured for extracting documents from emails by monitoring a specific email account and processing attachments. It includes validation checks to verify the compatibility of document formats, and also maintains secure access protocols to ensure the confidentiality of the information contained within the emails. Document acquisition module 110 may be designed to provide feedback to the user if an attached document's format is not supported by the system.

In some cases, the document acquisition module 110 can monitor a specific email account for documents containing claim deductions. In order to do this, the document acquisition module 110 can monitor the email account, email messages (e.g., body or subject line of an email) attachments to the emails, or the like for specific information (e.g., at least one of customer information, entity information, invoice information, deduction claim information, supporting information, contact information, signature information, or date information, or the like) or specific key words (e.g., damage, defect, discrepancy, reduction, deduction, amount withheld, claim, dispute, or the like). When one or more claim deduction documents are identified, the document acquisition module 110 can extract the one or more claim deduction documents and store the one or more claim deduction documents.

As an example, document acquisition module 110 can be physically embodied in several different forms of hardware. This can include servers, which provide the necessary computational capacity and data storage capabilities required by document acquisition module 110. These servers could be single machines or form part of a distributed network, which can be located either on-premises or in a cloud environment. Various data storage devices may also be incorporated, such as Hard Disk Drives (HDDs), Solid-State Drives (SSDs), or Network-Attached Storage (NAS) devices. Document acquisition module 110 may be implemented with network equipment, including routers, switches, and firewalls, to enable network communication and data transfer protocols. These components assist in maintaining connectivity between document acquisition module 110, other modules in the system, databases, and external APIs, while also ensuring the secure transmission of data. For manual user interaction with document acquisition module 110, various input/output devices such as keyboards, mice, touchscreens, monitors, or printers may be utilized. These devices allow users to upload documents to document acquisition module 110 and receive feedback about the processing status. In situations where physical documents are to be digitized, scanner devices may be employed. Depending on the implementation, security may be a concern for document acquisition module 110, and as such, dedicated security hardware, such as hardware-based firewalls or secure servers, may be used to safeguard sensitive data. For certain applications, document acquisition module 110 interfaces with third-party APIs, and an API gateway device could be used to manage, route, and secure API calls effectively.

The pre-processing stage includes, among other components, a document scraper module 120, which is configured for processing documents. Document scraper module 120 is configured to parse and extract data from the input document (e.g., one or more claim deduction documents obtained by document acquisition module 110). The type of data that document scraper module 120 can extract encompasses text (e.g., letters, words, phrases, paragraphs, etc.), numbers, special characters, and relevant metadata. As an example, general-purpose document parsing solutions such as open-source PDF parsers or Image OCR libraries in Python may be used to read the text characters from the document. These tools are also equipped to extract associated information with the text characters including, but not limited to, coordinates, encoding, font details (e.g., color, size, highlights, bolded, underlined, italicized, or the like), font styles (e.g., arial, times new roman, or the like), and text rotations.

Subsequent to data extraction, document scraper module 120 stores the acquired data in a configurable structured format, which could be a scraper document database or file that can be updated dynamically. This storage can take place in a relational or a NoSQL database, local or cloud-hosted, or in a flat file format such as CSV or JSON. Depending on the implementation, the type of data that can be found in a file and extracted by document scraper module 120 is multitudinous, including textual data (e.g., textual data in multiple languages, textual data of different fonts, sizes, colors, styles, or the like), image data (e.g., images embedded within a document, images referenced within a document, images linked within a document, JPG, PNG, GIF, TIFF, or the like), annotations (e.g., comments, highlights, bookmarks, author of the comments, author of the highlights, author of the bookmarks, etc.), links (e.g., links to other documents, images, web pages, media files, or the like), and metadata.

For example, each file's metadata varies, consisting of details such as font information (e.g., color, size, or the like), character encoding (e.g., Unicode or ASCII or the like), character and paragraph styles (e.g., bolded, underlined, italicized, numbered, or the like), word, line, and paragraph spacing (e.g., amount of space between words, lines, paragraphs, or the like), paragraph styles (e.g., indentation, justified, or the like), text positioning (e.g., location of text, words, letters, sentences, paragraphs, etc. on page, coordinates of text, words, letters, sentences, paragraphs, etc. on page, or the like), text flow (e.g., direction of text such as right to left or left to right or the like), language, annotations or comments (e.g., notes, highlights, author of notes or highlights, or the like), tags (e.g., header, footer, or the like), hyperlinks (e.g., links to other documents, images, web pages, media files, or the like), bookmarks (e.g., links to specific locations within a document, or the like), or the like.

In various embodiments, in the context of spreadsheet type files, the metadata may also consist of cell formatting (e.g., font size, color, alignment, cell size, etc.), cell styles (e.g., number, currency, header, title, text, etc.), worksheet metadata (e.g., name of worksheet, author, date created, date modified, etc.), data validation rules (e.g., one or more rules for each cell, specific data types, etc.), and formulas (e.g., formula itself, range of cells used in calculation, etc.). Similarly, for image type files, the metadata could comprise information about image dimensions (e.g., height, width, etc.), image format (e.g., JPG, PNG, TIFF, etc.), color profile (e.g., black and white, color, color space used in image, sRGB, Adobe RGB, etc.), resolution (e.g., number of pixels per inch or per centimeter, etc.), and compression (lossless, lossy, etc.). Document scraper module 120 is capable of parsing different file types, thereby extracting relevant textual data, image data, and metadata, making it an integral component in the document processing method.

As an example, document scraper module 120 can be implemented across various hardware configurations based on the scale of operation and specific needs. For regular tasks, it can operate on standard personal computers equipped with a multicore CPU, ample RAM, and substantial storage. In high-volume scenarios, it could run on server clusters featuring multiprocessor systems, extensive RAM, and considerable storage capacities. For high-performance tasks, specialized hardware like high-performance GPUs, ASICs, or FPGAs can be utilized for their parallel processing capabilities.

The content processing module 122 is configured to receive and process the scraped information from the preceding stages (e.g., document acquisition module 110 and document scraper module 120). The content processing module 122 may include a rule engine that has the capability to receive and store a variety of custom rules related to the processing of financial documents such as deduction claim documents. The custom rules assist in grouping or de-grouping words and phrases based on certain criteria such as the part of speech of the words and phrases, the relationship among them, and their semantic meaning. The rule engine applies these rules considering the distances and properties of characters, enabling the grouping of text characters into coherent words and phrases. For example, "Invoice Number" is considered a single phrase composed of two words, whereas "Vendor Item description" is partitioned into a word and a phrase, namely "Vendor" and "Item description".

Following the content processing module 122, the output is directed towards the noise removal module 124. The noise removal module 124 may be configured around a rule engine, which may be configured to receive and store a diverse set of custom rules for noise removal, specifically tailored to deduction claim documents. As an example, noise removal rules facilitate various operations, such as replacing each CID character in the content with its respective Unicode string value, eliminating all punctuation marks that precede any phrase in the content, and discarding recurring special characters which are typically used as section separators within the content. In some cases, the noise removal module further comprises removing watermark text, text beyond page margins, or the like. Implementation of these rules by the noise removal module can help ensure that the output content is devoid of noise, thereby readying it for subsequent stages of processing.

As an example, content classification machine learning (ML) module 130 is configured to classify data received from the previous stage (e.g., document acquisition module 110, document scraper module 120, content processing module 122, and/or noise removal module 124). In various embodiments, ML module 130 incorporates a fine-tuned transformer-based natural language processing (NLP) model, specifically LayoutLM v1, which is trained to classify content entities such as words and phrases into tabular and non-tabular data and/or into non-tabular keys, tabular keys, and values. This model may be implemented using established open-source Python libraries. As an example, the "LayoutLM v1" transformer-based model operates as the fundamental layer. This model applies the semantic, syntactic, and location context of document entities to classify them into non-tabular keys, tabular keys, and values. The "LayoutLM v1" model modifies the BERT architecture to include 2-D positional information (x and y coordinates of words within the document) as additional input embedding layers. For example, BERT is a multi-layer bidirectional transformer encoder that accepts a sequence of tokens and combines multiple layers to yield the final representations. In some implementations, the pre-training of "LayoutLM v1" ML model employs the IIT-CDIP Test Collection 1.02 which encompasses more than 6 million scanned documents and 11 million scanned document images from a diverse range of categories. This model may be, as an example, pre-trained on "Masked Visual-Language Model (MVLM)" and "Multi-label Document Classification (MDC)" tasks simultaneously.

In some embodiments, the "LayoutLM v1" model uses the "WordPiece" tokenizer to generate tokens of words in the document. For example, the fine-tuning of the base "LayoutLM v1" model may be carried out using 1000 unique document formats, including both text-based PDFs and images. These documents cover various domains such as deduction claims.

In some implementations, the tokenizer used in the base model may be modified to more accurately represent the context of certain kinds of data frequently found in claim deduction documents. These modifications include the addition of a special token for interpreting currency characters (replacing symbols such as $, £, etc. with [CUR] token), and special tokens for interpreting amount strings (floating point values are replaced with [SFLT] for "Short float" type data and [LFLT] for "Long float" type data).

As an example, an optimization of the model's learning for better capturing trends and patterns of claim deduction documents is carried out using the "AdamW" optimizer algorithm, configured at a learning rate of 5e-5, with the "cross-entropy" loss function.

Depending on the implementation, machine learning module 130 can be implemented on a variety of hardware, depending on computational needs. At its core, a multi-core CPU for parallel processing and substantial RAM for data handling may be used, while large storage capacities may be needed for handling extensive datasets and model outputs. For more demanding tasks, high-performance servers or server clusters can be employed. Specialized hardware like Graphics Processing Units (GPUs) and Tensor Processing Units (TPUs) can considerably enhance the computational performance, especially for the LayoutLM v1 model's operations that benefit from parallel processing capabilities. These units are especially effective for ML tasks such as training and fine-tuning the model, accelerating these processes significantly. For adaptable and scalable solutions, cloud-based platforms may be used, as they offer high-performance computing resources, including ML-specific hardware options that are especially beneficial for extensive ML tasks.

Figure 2:
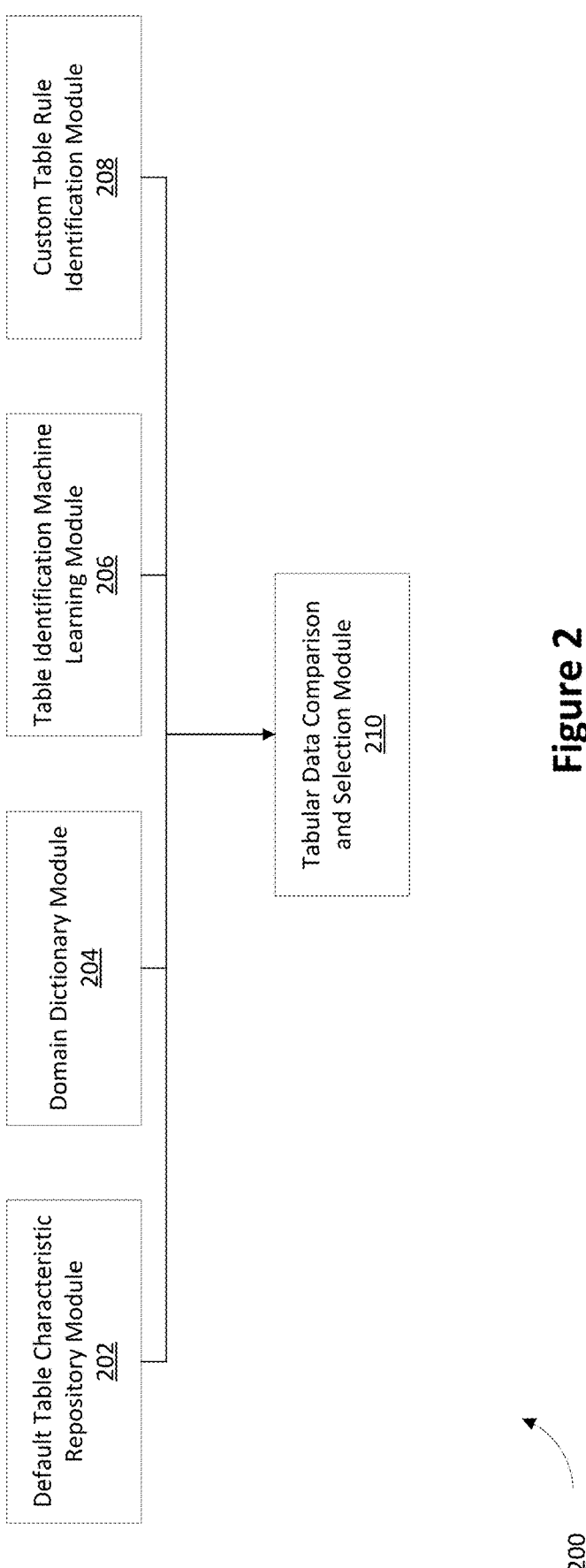
FIG. 2 is a simplified diagram illustrating one or more modules of the table extraction module according to embodiments of the present invention.

FIG. 2 is a simplified diagram 200 illustrating one or more modules of the table extraction module 140 according to embodiments of the present invention. The table extraction module 140 is configured to extract data classified as tabular data or tabular keys by the machine learning module 130. This diagram is merely an example, which should not unduly limit the scope of the claims. One of ordinary skill in the art would recognize many variations, alternatives, and modifications.

In some cases, as shown in FIG. 2, the table extraction module 140 might include at least one of a default table characteristic repository module 202, domain dictionary module 204, table identification learning module 206, or a custom table rule identification module 208. In some cases, all four modules can be used to extract the tabular data. Alternatively, in other cases one or more of the modules can be used to extract the tabular data. Each of the one or more modules can run independently of each other and in parallel to extract the tabular data of the claim deduction document. The default table characteristic repository module 202 is a rule module comprising a collection of mutually exclusive JSON rules defining characteristics of widely observed tables in claim deduction documents. The domain dictionary module 204 is a collection of mappings between claim fields and customer or claim deduction document observed claim format labels. For example—Item_Description can be defined as "Line Description" in a claim document from a first customer while Item_Description is defined as "Description" in a claim document from a second customer. The table identification learning module 206 is described with respect to application Ser. No. 18/480,741 in FIGS. 2 and 3 and it takes the claim document as an input and segregates its content into tabular keys, non-tabular keys, and values as the output. The custom table rule identification module 208 allows users to define rules for identifying one or more tables present in a deduction claim template of a specific business. The custom table rule identification module 208 is generally used for exceptional cases where the claim documents don't follow any documentation standard (e.g., the tables not having any border or distinction between header & item, or the like).

FIG. 3 is a flow diagram 300 illustrating a process for extracting tabular data of one or more deduction claim documents using at least one of a default table characteristic repository module 202, domain dictionary module 204, table identification learning module 206, or a custom table rule identification module 208 according to embodiments of the present invention. As an example, a parameter-driven rule-engine is employed for the identification, extraction, and transformation of any tabular content within the labeled document content 302 (e.g., content from the content processing module 122) of the one or more deduction claim documents. This conversion into their respective columns, rows, and corresponding values results in the final output 312, which can be generated in a JSON format. As shown in FIG. 3, operation of a parameter-driven rule-engine involves multiple sub-steps.

Firstly, Table Header Identification 304 is performed using at least one of a default table characteristic repository module 202, domain dictionary module 204, table identification learning module 206, or a custom table rule identification module 208.

For the default table characteristic repository module 202, the table headers are determined using one or more common rules for table headers. In a non-limiting example, the default table characteristic repository module 202 can look for one or more words, phrases, or values that have a same horizontal or vertical alignment and are at least one of bolded, centered, underlined, italicized, or the like. These are only some of the rules that can be associated with table headers.

For the domain dictionary module 204, the table headers can be determined by iterating through all the labels, words, phrases etc. of a claim deduction document and comparing them with customer or claim deduction defined headers. Once one or more deduction claim headers are found, the domain dictionary module 204 can label them as a table header. For example—Item_Description can be determined as a header of a claim deduction document. The domain dictionary module 204 can then search for the term "Item_Description" or any other related words (e.g., "Line Description," "Description," or the like and label the terms as table headers.

For the table identification machine learning module 206 a machine learning model can be used to identify table headers. This process is further described with respect to application Ser. No. 18/480,741 in FIGS. 2 and 3. As an example, in order to identify table headers, the table identification machine learning module 206 can learn that a sequence of tabular key type entities with the same horizontal alignment or vertical alignment is considered to represent the tabular header For the custom table rule identification module 208, table headers can be identified using user defined rules for a deduction claim template for a specific business. In a non-limiting example, the custom table rule identification module 208 checks if any custom rule is present for the incoming claim template and then identifies the table headers by identifying the word or phrases satisfying the defined characteristic (e.g., name of the header, exact word or phrase of the header, position or alignment of header, data type of the header, format of the header, column or row number of the header, or the like).

Following the identification of table headers 304, the Table Body Identification process 306 (which can also be referred to as tabular value identification process) is initiated using at least one of a default table characteristic repository module 202, domain dictionary module 204, table identification learning module 206, or a custom table rule identification module 208. In some cases, Table Body Identification process 306 include determining one or more words, phrases, values, numbers contained within a body of the tabular data.

For the default table characteristic repository module 202, the domain dictionary module 204, the table identification learning module 206, or the custom table rule identification module 208 the table body or values associated with the identified headers can be determined using one or more common rules for a table body. In a non-limiting example, once the table headers are identified using each of the modules 202-208, the modules 202-208 can look for words, phrases, values, symbols, or the like following the identified table headers and having start and end coordinates in between the table header's coordinates and annotate them as table body or table value. In some cases, the modules 202-208 can also determine the potential last row of the table in order to ensure each module 202-208 captures all the values within the table header's coordinates. The potential last row of the table can be identified based on content density and horizontal or vertical consistency of patterns within the table. These are only some of the rules that can be used to identify the table body and/or content within the table body.

Subsequent to table body identification 306, a Data Post-Processing step 308 is undertaken by at least one of a default table characteristic repository module 202, domain dictionary module 204, table identification learning module 206, or a custom table rule identification module 208. In the post-processing step 308, non-tabular key type entities are removed from within the identified table span. Entities such as "Summaries", "Sub Totals", and others are examples of the content eliminated during this step. In some cases, table headers with NULL items (e.g., table headers without any data in a subsequent row or column) can be passed onto the process for classifying non-tabular data, non-tabular keys, or values of FIGS. 4 and 5. Table headers with not-NULL items (e.g., table headers with data in a subsequent row) can be classified as tabular data and be processed in the Column and Row Resolution step 310.

Next, the Column and Row Resolution step 310 is executed by at least one of a default table characteristic repository module 202, domain dictionary module 204, table identification learning module 206, or a custom table rule identification module 208. During this phase, value type entities within the table span are assigned to their corresponding columns or rows and separated into individual rows. In various implementations, rules based on content density, vertical and horizontal alignment are leveraged to achieve this. For example, two key thresholds may play a role in this process: (1) Stepwise Vertical Threshold, which indicates the maximum accepted distance between two vertically adjacent entities belonging to the same phrase, and (2) Stepwise Horizontal Threshold, which indicates the maximum accepted distance between two horizontally adjacent entities belonging to the same phrase. In an example, a parameter indicating the number of columns signifies the minimum number of tabular keys type entities with the same horizontal alignment needed to be recognized as a tabular header. Parameter values may be selected through a comprehensive statistical analysis performed on the annotated training data.

Once the Column and Row Resolution step 310 is executed by at least one of the default table characteristic repository module 202, the domain dictionary module 204, the table identification learning module 206, or the custom table rule identification module 208, each of the default table characteristic repository module 202, the domain dictionary module 204, the table identification learning module 206, or the custom table rule identification module 208 output a corresponding table.

The one or more outputted tables are then sent to the tabular selection and comparison module 210 of FIG. 2, where the one or more tables are compared among each other to remove the redundant information or inconsistent information and to merge tables with the same headers but different items. In order to remove redundant information or inconsistent information, priority is given to the custom rule module 208 then the domain dictionary module 204 then the default table characteristic repository module 202 then the table identification machine learning module 206. In other words, information from the custom rule-based module 208 is used first and considered to be more accurate while the information from the table identification machine learning module 206 is used last and is considered to be less accurate.

The tabular selection and comparison module 210 of FIG. 2 can then output 312 a corresponding table a configurable JSON file or update a database containing claim deduction information. The values marked as tabular data and contained within the output 312 do not need to be processed further. The values which are not identified as tabular data can be marked for further processing.

Figure 4:
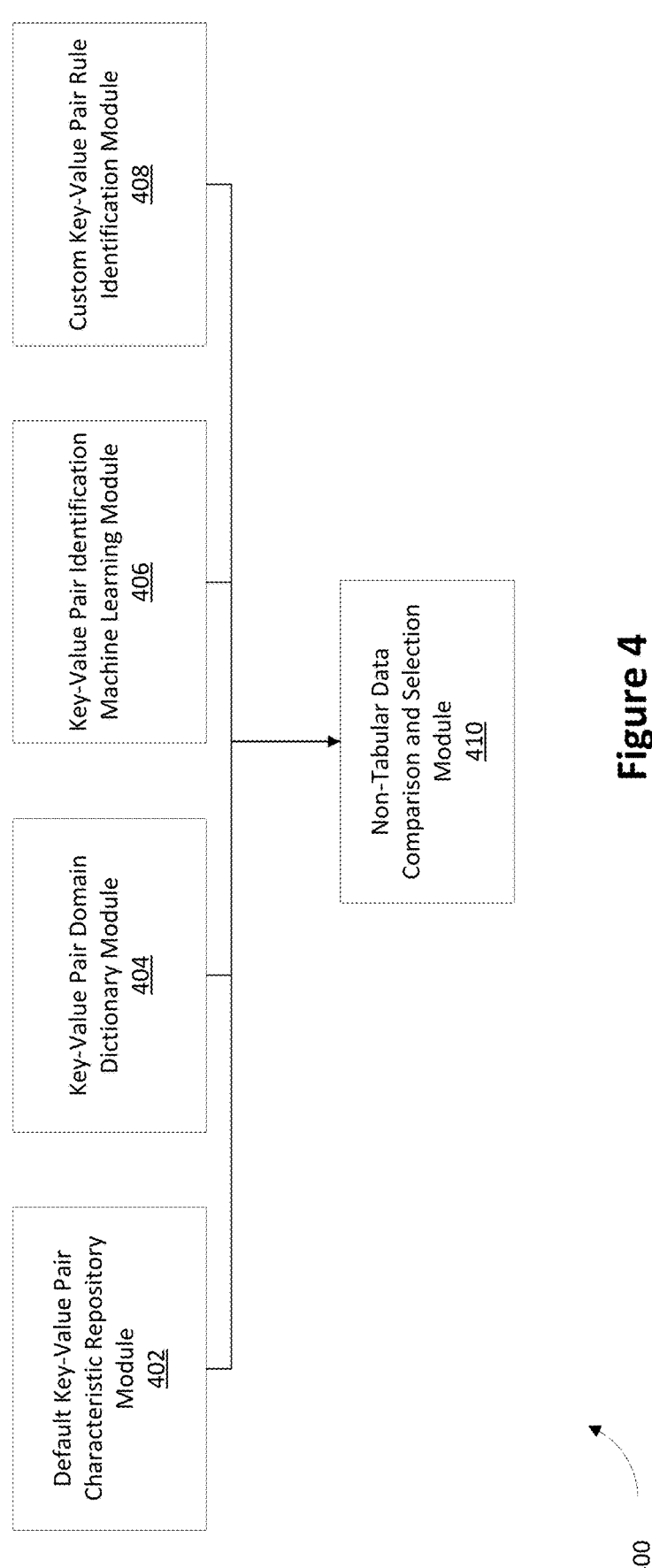
FIG. 4 is a simplified diagram illustrating one or more modules of the key value pair extraction module according to embodiments of the present invention.

Referring back to FIG. 1, data that is not classified as tabular data or tabular keys can be passed on to the key value pair extraction module 142. FIG. 4 is a simplified diagram illustrating one or more modules of the key value pair extraction module 142 according to embodiments of the present invention. The key value pair extraction module 142 is configured to extract data classified as non-tabular data or non-tabular keys by the machine learning module 130. This diagram is merely an example, which should not unduly limit the scope of the claims. One of ordinary skill in the art would recognize many variations, alternatives, and modifications.

In some cases, as shown in FIG. 4, the key-value pair extraction module 142 might include at least one of a default key-value pair characteristic repository module 402, key-value pair domain dictionary module 404, key-value pair identification learning module 406, or a custom key-value pair rule identification module 408. In some cases, all four modules can be used to extract the non-tabular data. Alternatively, in other cases one or more of the modules can be used to extract the tabular data. Each of the one or more modules can run independently of each other and in parallel to extract the non-tabular data of the claim deduction document.

The default key-value pair characteristic repository module 402 is a rule module comprising a collection of mutually exclusive JSON rules defining characteristics of widely observed non-tabular in claim deduction documents. The key-value pair domain dictionary module 404 is a collection of mappings between claim fields and customer or claim deduction document observed claim format labels. For example—Item_Description can be defined as "Line Description" in a claim document from a first customer while Item_Description is defined as "Description" in a claim document from a second customer. The key-value pair identification learning module 406 is described with respect to application Ser. No. 18/480,741 in FIG. 4 and it takes the claim document as an input and segregates its content into tabular keys, non-tabular keys and values as the output. The custom key-value pair rule identification module 408 allows users to define rules for identifying non-tabular key-value pairs present in a deduction claim template of a specific business. The custom key-value pair rule identification module 408 is generally used for exceptional cases where the claim documents don't follow any documentation standard (e.g., the tables not having any border or distinction between header & item, or the like).

Figure 5:
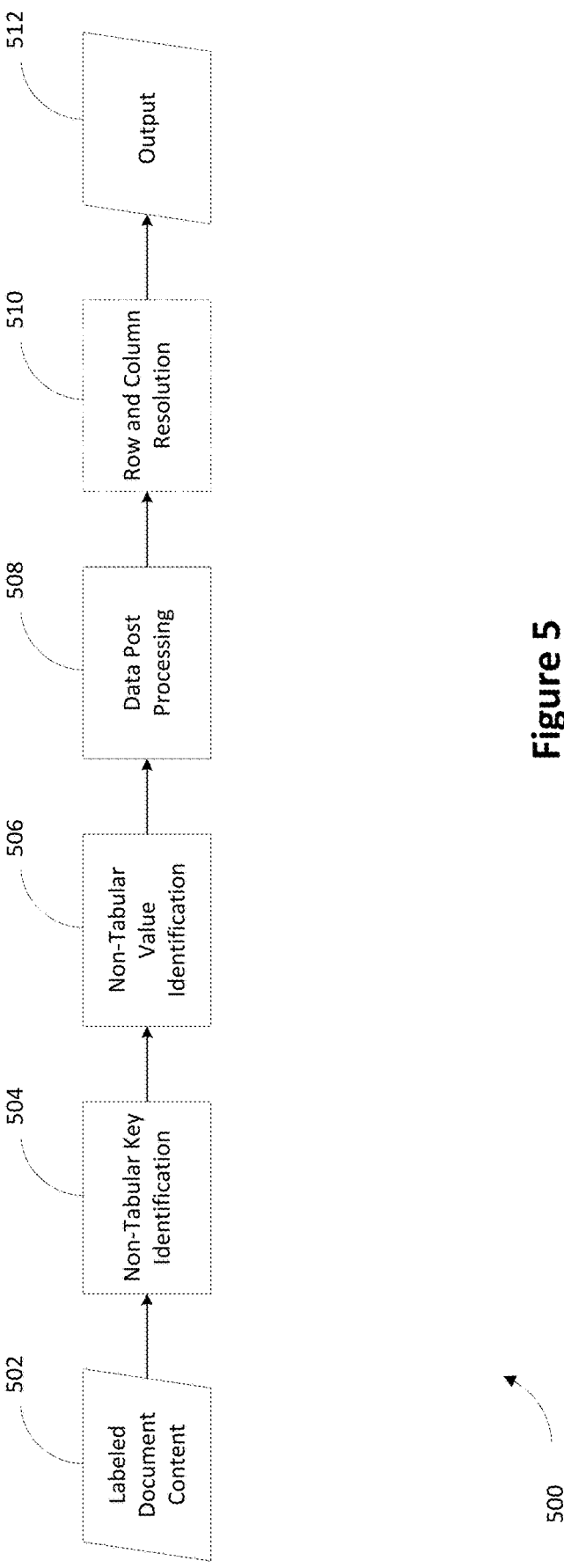
FIG. 5 is a flow diagram illustrating a process for extracting non-tabular data from one or more deduction claim

FIG. 5 is a flow diagram 500 illustrating a process for extracting non-tabular data from one or more deduction claim documents using at least one of the default key-value pair characteristic repository module 402, the key-value pair domain dictionary module 404, the key-value pair identification learning module 406, or the custom key-value pair rule identification module 408 according to embodiments of the present invention. As an example, a parameter-driven rule-engine is employed for the identification, extraction, and transformation of any non-tabular content within the labeled document content 502 (e.g., content from the content processing module 122 and/or table extraction module 140) of the one or more deduction claim documents. In some cases, the non-tabular data can then be converted into one or more columns, rows, and corresponding values results in the final output 512, which can be generated in a JSON format. As shown in FIG. 5, operation of a parameter-driven rule-engine involves multiple sub-steps.

Firstly, Non-Tabular Key Identification 504 is performed using at least one of a default key-value pair characteristic repository module 402, key-value pair domain dictionary module 404, key-value pair identification learning module 406, or a custom key-value pair rule identification module 408.

For the default key-value pair characteristic repository module 402, the non-tabular keys are determined using one or more common rules for non-tabular keys. In a non-limiting example, the default key-value pair characteristic repository module 402 can look for one or more words, phrases, or values that are at least one of bolded, centered, underlined, italicized, or the like. Alternatively, the default key-value pair characteristic repository module 402 can look for one or more key words (e.g., total, amount, deduction, claim, explanation), phrases (e.g., invoice number, item description, etc.), sentences, or the like commonly associated with keys across one or more claim deduction documents. These are only some of the rules that can be associated with key of claim deduction documents.

For the key-value pair domain dictionary module 404, the keys can be determined by iterating through all the labels, words, phrases etc. of a claim deduction document and comparing them with customer or claim deduction defined keys. Once one or more deduction claim keys are found, the key-value pair domain dictionary module 404 can label them as a key. For example—Item_Description can be determined as a key of a claim deduction document. The key-value pair domain dictionary module 404 can then search for the term "Item_Description" or any other related words (e.g., "Line Description," "Description," or the like) and label the terms as keys.

For the key-value pair identification machine learning module 406 a machine learning model can be used to identify non-tabular keys. This process is further described with respect to application Ser. No. 18/480,741 in FIG. 4. As an example, in order to identify keys, the key-value pair identification machine learning module 406 can learn that a sequence of non-tabular key type entities are typically at least one of bolded, centered, underlined, italicized, or the like and determine that one or more words or phrases that are at least one of bolded, centered, underlined, italicized, or the like are non-tabular keys.

For the custom key-value pair rule identification module 408, non-tabular keys can be identified using user defined rules for a deduction claim template for a specific business. In a non-limiting example, the custom key-value pair rule identification module 408 checks if any custom rule is present for the incoming claim template and then identifies the keys by identifying the word or phrases satisfying the defined characteristic (e.g., name of the non-tabular key, exact word or phrase of the non-tabular key, position or alignment of non-tabular key, data type of the non-tabular key, format of the non-tabular key, or the like).

Following the identification of the keys 504, the non-tabular value identification process 506 is initiated using at least one of the default key-value pair characteristic repository module 402, key-value pair domain dictionary module 404, key-value pair identification learning module 406, or a custom key-value pair rule identification module 408. In some cases, non-tabular value identification process 506 includes determining one or more values associated with the non-tabular keys.

For the default key-value pair characteristic repository module 402, the key-value pair domain dictionary module 404, the key-value pair identification learning module 406, or the custom key-value pair rule identification module 408 the values associated with the keys can be determined using one or more common rules for values. In a non-limiting example, once the keys are identified using each of the modules 402-408, the modules 402-408 can look for words, phrases, values, numbers, symbols, or the like following, below, or within a predetermined distance of the identified key or grouped together with an identified key. These are only some of the rules that can be used to identify the values associated with an identified key.

Subsequent to table body identification 506, a Data Post-Processing step 508 is undertaken by at least one of a default key-value pair characteristic repository module 402, the key-value pair domain dictionary module 404, the key-value pair identification learning module 406, or the custom key-value pair rule identification module 408. In the post-processing step 508, non-tabular key type entities and non-key-value pair type entities are removed. Entities such as "Summaries", "Sub Totals", and others are examples of the content eliminated during this step. In some cases, keys with NULL items (e.g., keys without any data within a predetermined distance) can be passed onto the process for classifying non-tabular data and non-tabular key-pair values. Keys with not-NULL items (e.g., keys with data within a predetermined distance) can be classified and be processed in the Column and Row Resolution step 510.

Next, the optional Column and Row Resolution step 510 can be executed by at least one of the default key-value pair characteristic repository module 402, the key-value pair domain dictionary module 404, the key-value pair identification learning module 406, or the custom key-value pair rule identification module 408. During this phase, key-value pairs can be assigned to a corresponding column or row and/or separated into individual rows or columns of a table. However, in some cases, the key-value pairs can be output-ted without using the Column and Row Resolution step 510 and without assigning them to one or more rows or columns.

Once the Column and Row Resolution step 510 is executed by at least one of the default key-value pair characteristic repository module 402, the key-value pair domain dictionary module 404, the key-value pair identification learning module 406, or the custom key-value pair rule identification module 408, each of the default key-value pair characteristic repository module 402, the key-value pair domain dictionary module 404, the key-value pair identification learning module 406, or the custom key-value pair rule identification module 408 output one or more key value-pairs. In some cases, the corresponding one or more key-value pairs can be outputted individually or in a table format.

The one or more outputted tables are then sent to the key-value pair selection and comparison module 410 of FIG. 4, where the one or more tables are compared among each other to remove the redundant information or inconsistent information and to merge tables with the same keys but different items. In order to remove redundant information or inconsistent information, priority is given to the custom key-value pair rule module 408 then the key-value pair domain dictionary module 404 then the default key-value pair characteristic repository module 402 then the key-value pair identification machine learning module 406. In other words, information from the custom key-value pair rule-based module 408 is used first and considered to be more accurate while the information from the key-value pair identification machine learning module 406 is used last and is considered to be less accurate.

The tabular selection and comparison module 410 of FIG. 4 can then output 512 a corresponding table configurable JSON file or update a database containing claim deduction information. The values marked as key-value pair data and contained within the output 512 do not need to be processed further. The values which are not identified as tabular data or key-value pair data can be marked for further processing.

Referring back to FIG. 1, once the tabular data and key-pair value data has been extracted from one or more claim deduction documents, the rest of the data can be classified as paragraph data and extracted by paragraph extraction module 144. Paragraph extraction module 144 can label the remaining data as paragraph data and then output the data labeled as paragraph data as a JSON file or update a database with the paragraph data.

In some cases, associator module 150 can take the tabular keys, tabular values, non-tabular keys, non-tabular values and paragraph data identified by tabular data extraction module 140, the key-value pair extraction module 142, and the paragraph extraction module 144 and associate the tabular keys, tabular values, non-tabular keys, non-tabular values and paragraph data identified from the document to appropriate attributes of a claim deduction or to appropriate attributes of the data output module 160.

The Associator Module 150 can associate the values of the tabular keys, tabular values, non-tabular keys, non-tabular values and paragraph data to claim item level attributes and/or headers or keys in the data output module 160 or data output file. In a non-limiting example, a header or key defined as "Desc" can be associated with or assigned to "Item description" of the output file and a header or key defined as "Price" can be associated with or assigned to "Unit Cost" of the output file. In another non-limiting example, a header or key defined as "deduction number" can be associated with "Claim Number" of the data output module 160 or data output file. Corresponding values associated with the header or key can then be organized or positioned in association with the appropriate attributes of the data output module 160 or the data output file. In a non-limiting example, values (e.g., 123456, 234567, or the like) associated with the "deduction number" can be organized in association with or positioned underneath, beside, or near "Claim Number" of the data output module 160 or data output file. Paragraph data can be associated with appropriate attributes of the data output module 160 as either header or keys or values associated with headers or keys.

The associator module 150 can use the domain dictionary modules 204 and/or 404 to find associations between tabular keys, tabular values, non-tabular keys, non-tabular values and paragraph data and appropriate attributes of a claim deduction or to appropriate attributes of the data output module 160.

Alternatively, the associator module 150 can also use Large Language Models (LLMs) to perform semantic analysis on the data identified in the data identifier module and find meaningful relationships or associations between the different categories of data. Some LLMs that can be used include, without limitation, GPT models, Claude, ROBERTa, LLAMA, and BERT models. GPT models are generative pre-trained transformer models that use the transformer architecture to learn from large amounts of text data. They have four variants: Ada, Babbage, Curie, and Davinci, which differ in the number of parameters, the amount of data they were trained on, and the types of tasks they can perform. BERT models are bidirectional encoder representations from transformers models that use the transformer architecture to learn from both left and right context of a given word. They can be fine-tuned for various natural language understanding tasks, such as classification, sentiment analysis, question answering, and named entity recognition.

Data output module 160 is configured for classification and storage of the data, which may be saved in a JSON file. As an example, for data classified as tabular data, the data output module 160 generates a structured representation (e.g., shown in FIG. 6, table 604), which may be displayed as tables, spreadsheets, or other suitable formats that present the data in a clear and organized manner. Data output module 160 may be configured to provide formatting options, such as bolding, italics, colors, and other visual cues to highlight specific data or provide additional context. Data output module 160 can further generate metadata, such as column headers, row labels, data types, and other relevant information, to enhance user comprehension.

For data classified as non-tabular data or paragraph data, data output module 160 may generate a structured representation (e.g., shown in FIG. 6, table 604), which may be presented as paragraphs, bullet points, lists, tables, spreadsheets, or other formats that render the data readable and well-organized. As an example, data output module 160 may provide formatting options, including adjustments to font size, indentation, and line spacing. Additional features such as hyperlinking, inline definitions, or tooltips may also be incorporated to provide contextual information or facilitate navigation within the non-tabular data. Data output module 160 can further generate metadata, such as column headers, row labels, data types, and other relevant information, to enhance user comprehension.

In some cases, the structured representation (e.g., shown in FIG. 6, table 604) represents a cohesive view of the tabular data, non-tabular data, and paragraph data combined. For example, all the data can be combined in a table, spreadsheet, paragraph, bullet point, list, or other format configured to provide an overall picture of the tabular data, non-tabular data, and paragraph data. In other cases, the structured representation (e.g., shown in FIG. 6, table 604) represents a cohesive view of at least one of the tabular data, non-tabular data, and paragraph data from multiple claim deduction documents. By combining information from multiple documents, a seller can obtain a comprehensive of pending or outstanding deduction claims and address the pending or outstanding deduction claims on one graphical user interface.

Data output module 160 may provide customization and interactivity features, thereby allowing users to adjust the display of the output according to their preferences. This may include changing formatting options, choosing different visual themes, or applying filters to focus on specific subsets of data. Data output module 160, in some implementations, may provide interactive features like sorting, searching, and filtering to allow dynamic exploration and analysis of the displayed data. In some cases, data output module 160 can either automatically prioritize or order or allow a user to prioritize or order information extracted from one or more deduction claim documents. In a non-limiting example, information from one or more deduction claim documents can be prioritized based on a date (e.g., older claims being more likely to shown at a top of a page, newer claims being more likely to shown at a top of a page, or the like) of the claim, based on an amount requested to be deducted (e.g., larger amounts being more likely to be shown at a top of a page, or the like), based on one or more goods or services associated with the claim, or the like.

Data output module 160 may be configured to facilitate export and sharing, thus enabling users to export the displayed output in various formats such as PDF, Excel, CSV, or HTML. For example, users can share the output with others, either in its original format or as an exported file, promoting collaboration and knowledge sharing.

In some implementations, data output module 160 is configured for database integration and update, capable of integrating with third-party database systems through connections or appropriate application programming interface (APIs). For example, data output module 160 can support various database types, including relational databases, NoSQL databases, document databases, among others. It is to be appreciated that data output module 160 may be configured to efficiently update the database with the extracted information, maintaining real-time synchronization and data consistency. Data output module 160 can also provide mechanisms for error handling, transaction management, and data logging to uphold data integrity and traceability.

Depending on the implementation, data output module 160 can be implemented on a multitude of hardware infrastructures tailored to a range of application and usage scenarios. Essential components of the hardware infrastructure for this data output module 160 comprise a processing unit and a memory unit. The processing unit, which may be a Central Processing Unit (CPU) or a Graphics Processing Unit (GPU), carries out the execution of program instructions. The memory unit provides the storage for these program instructions, incoming data, and processed results.

As an example, data output module 160 can be configured on a server or a cluster of servers. These servers could be designed with multi-core or multi-processor systems, extensive quantities of RAM, and significant storage capacities. They could be housed in a dedicated data center or utilized as part of a cloud computing platform. High-performance requirements may involve implementing data output module 160 on specialized hardware. This hardware could include high-performance GPUs, Application-Specific Integrated Circuits (ASICs), or Field-Programmable Gate Arrays (FPGAs). Such devices can expedite data processing tasks by carrying out specific operations in parallel. Data output module 160 may operate in a cloud-based environment, harnessing resources from providers, which provide a scalable solution adaptable to varying workloads, with the benefits of simplified maintenance and reduced upfront costs.

Retraining module 170 is configured to evaluate and enhance the accuracy of data extraction processes from structured and unstructured documents (e.g., one or more claim deduction documents). In an accuracy assessment process, retraining module 170 compares the extracted data with ground truth or reference data to assess its accuracy. This comparison may utilize techniques including, but not limited to, exact matching, fuzzy matching, similarity metrics, or machine learning-based classification. For example, accuracy is quantified using suitable metrics such as precision, recall, or any other relevant measures, providing a comprehensive evaluation of the data extraction process. In some cases, comparing the output data file to reference data or ground truth data comprises comparing one or more data objects in the output data file to at least one customer information, entity information, invoice information, deduction claim information, supporting information, contact information, signature information, or date information stored in a data storage and associated with the at least one corresponding deduction claim. In other words, an invoice number extracted from the one or more deduction claim documents can be compared to one or more invoice numbers associated with a seller to confirm that the deduction claim is associated with the seller.

Retraining module 170 may also generate evaluation reports offering insights into the accuracy of the data extraction. These reports encapsulate information on error patterns and distributions across various document types or data elements, and identify the specific types and sources of errors. To facilitate a thorough understanding of the assessment results, these reports encompass visualizations, statistical summaries, and a detailed analysis of errors.

In various embodiments, a feedback generation process is built on the insights from the evaluation reports. Retraining module 170 identifies patterns or rules contributing to errors and provides actionable recommendations for refinement. This feedback can encompass suggestions for modifying machine learning model parameters, updating data preprocessing techniques, adjusting feature selection, or refining other aspects of the data extraction pipeline.

Feedback incorporation is another function that may be performed by retraining module 170. This process facilitates the integration of feedback into the machine learning model and the data extraction pipeline, driving continuous improvement. Interfaces, APIs, or hooks may be used for seamless integration with the data extraction pipeline and facilitate the implementation of feedback. This process could involve retraining the machine learning model, updating preprocessing techniques, adjusting feature selection criteria, or modifying other parameters based on the feedback received.

Retraining module 170 may provide real-time and automated feedback, operating in real-time or at regular intervals to provide ongoing feedback. It integrates with the data extraction pipeline, automatically assessing accuracy, generating reports, and providing feedback without manual intervention. This may be achieved through APIs, event triggers, or workflow integration, ensuring timely and automated feedback incorporation.

In some embodiments, the retraining module 170 is retrained after a predetermined amount of time passes (e.g., a week, a month, etc.) using an updated training dataset that additionally includes document samples for which predictions did not perform as expected. In order to retrain the machine learning models, training data of the identified low performing samples is first collected and then appended to the training data set that was used originally. Fine-tuning of the model is then re-run using this updated training dataset so that the accuracy and coverage of captured trends/patterns is improved.

Retraining module 170 may provide performance tracking and comparison. For example, this process tracks the performance of the data extraction pipeline over time, capturing changes in accuracy metrics and error patterns. Retraining module 170 may provide comparisons between different iterations or versions of the machine learning model or data extraction pipeline, assessing the impact of feedback and improvement efforts.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method for processing documents, the method comprising:

receiving a first document containing a deduction claim;

extracting document information from the first document, wherein the document information comprises at least one of tabular data or non-tabular data;

classifying the document information using a first machine learning model, the first machine learning model being trained using a plurality of document formats;

generating one or more data objects associated with the deduction claim based on the classification of the document information using the first machine learning model, wherein generating the one or more data objects associated with the deduction claim based on the tabular data comprises:

processing the tabular data with two or more tabular data extraction modules, wherein the two or more tabular data extraction modules process the tabular data in parallel; and generating the one or more data objects associated with the deduction claim based on the tabular data processed by the two or more tabular data extraction modules;

wherein generating the one or more data objects associated with the deduction claim based on the non-tabular data comprises:

processing the non-tabular data with two or more key-value pair data extraction modules, wherein the two or more key-value pair data extraction modules process the non-tabular data in parallel; and generating the one or more data objects associated with the deduction claim based on the non-tabular data processed by the two or more key-value pair data extraction modules;

providing an output data file comprising the one or more data objects; and updating the first machine learning model using at least the output data file.

2. The method of claim 1, wherein the document information comprises at least one of customer information, entity information, invoice information, deduction claim information, supporting information, contact information, signature information, or date information.

3. The method of claim 1, wherein classifying the document information using the first machine learning model comprises:

identifying within the document information at least one of tabular data or non-tabular data; and classifying using the first machine learning model the document information based on an identification of at least one of tabular data or non-tabular data.

4. The method of claim 3, wherein the non-tabular data comprises at least one of key-value pairs or paragraph data.

5. The method of claim 1, wherein the document information comprises both tabular data and non-tabular data, wherein classifying the document information using the first machine learning model comprises:

identifying document information associated with the tabular data and the non-tabular data;

extracting using a first extraction module the tabular data; and extracting using a second extraction module the non-tabular data.

6. The method of claim 5, further comprising generating a table using the one or more data objects, the table comprising one or more first data objects generated based on the extraction of the tabular data and one or more second data objects generated based on the extraction of the non-tabular data.

7. The method of claim 1, wherein, when the two or more tabular data extraction modules generate repeating or redundant first data objects, the one or more repeating or redundant first data objects are removed based on an order of preference associated with the two or more tabular data extraction modules and wherein, when the two or more key-value pair data extraction modules generate repeating or redundant second data objects, the one or more repeating or redundant second data objects are removed based on an order of preference associated with the two or more key-value pair data extraction modules.

8. The method of claim 1, wherein classifying using the first machine learning model the document information further comprises classifying the document information into at least one of one or more keys or one or more values;

wherein generating the one or more data objects further comprises defining at least one data object of the one or more data objects as at least one of a key or a value; and wherein the method further comprises associating the at least one data object using a second machine learning model with one or more attributes of the data output file.

9. The method of claim 8, wherein associating the one or more data objects with the one or more attributes of the data output file further comprises:

associating the at least one data object with one or more attributes of the data output file based on whether the at least one data object is defined as at least one of the key or the value;

based on a determination that the at least one data object is defined as the key, matching the key with a first header of the data output file using the second machine learning algorithm; and based on a determination that the at least one data object is defined as the value, determining a corresponding key using the second machine learning algorithm associated with the value from the document information or the one or more data objects, matching using the second machine learning algorithm the corresponding key with a corresponding header of the data output file, and adding using the second machine learning algorithm the value to the corresponding header of the data output file.

10. The method of claim 1, further comprising generating a table using the one or more data objects, the table comprising a header that is based at least on the document information.

11. The method of claim 10, wherein the header is at least one of customer information, entity information, invoice information, deduction claim information, supporting information, contact information, signature information, or date information.

12. A method for processing documents, the method comprising:

extracting document information from one or more deduction claim documents by a data extraction module, wherein the document information comprises at least one of tabular data or non-tabular data;

classifying the one or more deduction claim documents or the document information using a machine learning model, the machine learning model being trained using a plurality of document formats;

generating one or more data objects associated with at least one corresponding deduction claim based on the classification of the document information using the machine learning model, wherein generating the one or more data objects associated with the deduction claim based on the tabular data comprises:

processing the tabular data with two or more tabular data extraction modules, wherein the two or more tabular data extraction modules process the tabular data in parallel; and generating the one or more data objects associated with the deduction claim based on the tabular data processed by the two or more tabular data extraction modules;

wherein generating the one or more data objects associated with the deduction claim based on the non-tabular data comprises:

processing the non-tabular data with two or more key-value pair data extraction modules, wherein the two or more key-value pair data extraction modules process the non-tabular data in parallel; and generating the one or more data objects associated with the deduction claim based on the non-tabular data processed by the two or more key-value pair data extraction modules;

providing an output data file comprising the one or more data objects;

providing an accuracy assessment for the at least one corresponding deduction claim by comparing the output data file to reference data or ground truth data; and modifying the machine learning model using at least the accuracy assessment.

13. The method of claim 12, further comprising identifying error patterns associated with the output data file, wherein the error patterns comprise at least one error pattern associated with at least one of customer information, entity information, invoice information, deduction claim information, supporting information, contact information, signature information, or date information for the at least one corresponding deduction claim.

14. The method of claim 13, further comprising modifying the machine learning model using at least the error patterns.

15. The method of claim 13, further comprising modifying the data extraction module using at least the error patterns.

16. The method of claim 12, wherein comparing the output data file to reference data or ground truth data comprises comparing one or more data objects in the output data file to at least one customer information, entity information, invoice information, deduction claim information, supporting information, contact information, signature information, or date information stored in a data storage and associated with the at least one corresponding deduction claim.

17. The method of claim 12, further comprising classifying the document information into tabular data, key-value pair data, value data, or paragraph data.

18. A method for processing documents, the method comprising:

accessing one or more deduction claims;

extracting document information from the one or more deduction claims, wherein the document information comprises at least one of tabular data or non-tabular data;

classifying the document information using a first machine learning model, the first machine learning model being trained using a plurality of document formats;

generating one or more data objects associated with at least one corresponding deduction claim and based on the classification of the document information using the first machine learning model, wherein generating the one or more data objects associated with the deduction claim based on the tabular data comprises:

processing the tabular data with two or more tabular data extraction modules, wherein the two or more tabular data extraction modules process the tabular data in parallel; and generating the one or more data objects associated with the deduction claim based on the tabular data processed by the two or more tabular data extraction modules;

wherein generating the one or more data objects associated with the deduction claim based on the non-tabular data comprises:

processing the non-tabular data with two or more key-value pair data extraction modules, wherein the two or more key-value pair data extraction modules process the non-tabular data in parallel; and generating the one or more data objects associated with the deduction claim based on the non-tabular data processed by the two or more key-value pair data extraction modules;

associating the one or more data objects using a second machine learning model with one or more attributes of an output data file; and generating the output data file based on the second machine learning module comprising the one or more data objects associated with the one or more attributes of the output data file.

19. The method of claim 18, further comprising prioritizing or ordering two or more corresponding deduction claims in the output data file based on at least one of customer information, entity information, invoice information, deduction claim information, supporting information, contact information, signature information, or date information associated with the at least one corresponding deduction claim.

* * * * *